US010848509B1

(12) United States Patent
McNab et al.

(10) Patent No.: US 10,848,509 B1
(45) Date of Patent: Nov. 24, 2020

(54) APPARATUS AND METHOD TO ANALYZE DNS TRAFFIC TO DETECT ANOMALIES

(71) Applicant: AlphaSOC, Inc., Boston, MA (US)

(72) Inventors: Christopher McNab, Oakland, CA (US); Tomasz Grodzki, Warsaw (PL); Mariusz Nowak, Wroclaw (PL)

(73) Assignee: ALPHASOC, INC., Boston, MA (US)

( * ) Notice: Subject to any disclaimer, the term of this patent is extended or adjusted under 35 U.S.C. 154(b) by 169 days.

(21) Appl. No.: 16/126,922

(22) Filed: Sep. 10, 2018

Related U.S. Application Data

(60) Provisional application No. 62/577,057, filed on Oct. 25, 2017.

(51) Int. Cl.
*H04L 29/06* (2006.01)
*H04L 29/12* (2006.01)
*G06F 16/28* (2019.01)

(52) U.S. Cl.
CPC ...... *H04L 63/1425* (2013.01); *H04L 61/1511* (2013.01); *H04L 63/14* (2013.01); *H04L 63/1416* (2013.01); *G06F 16/285* (2019.01)

(58) Field of Classification Search
CPC . H04L 63/14; H04L 63/1408; H04L 63/1416; H04L 63/1433; H04L 63/1441; H04L 63/1425; H04L 63/20; H04L 63/205
See application file for complete search history.

(56) References Cited

U.S. PATENT DOCUMENTS

2016/0065611 A1\* 3/2016 Fakeri-Tabrizi .... H04L 63/1425 726/23
2016/0381070 A1\* 12/2016 Zhang ................ H04L 63/1408 726/23

\* cited by examiner

*Primary Examiner* — Edward Zee
(74) *Attorney, Agent, or Firm* — Cooley LLP

(57) ABSTRACT

An apparatus has a processor and a memory connected to the processor. The memory stores instructions executed by the processor to receive domain name system (DNS) query event data. A timestamp, source internet protocol (IP) address, and fully qualified domain name (FQDN) value are extracted from each DNS query event record. Each FQDN value is classified to generate corresponding key-value pairs. For each source IP address, key-value pairs during a period of time are counted. It is determined if a FQDN value or key-value pair value indicates anomalous behavior. One or more alert messages are generated if anomalous behavior is determined.

10 Claims, 3 Drawing Sheets

APPARATUS AND METHOD TO ANALYZE DNS TRAFFIC TO DETECT ANOMALIES

CROSS-REFERENCE TO RELATED APPLICATION

This application claims priority to U.S. Provisional Patent Application Ser. No. 62/577,057, filed Oct. 25, 2017, the contents of which are incorporated herein by reference.

FIELD OF THE INVENTION

This invention relates generally to the detection of security threats within a computer network, including malware, ransomware, and unwanted programs. More specifically, the invention relates to the detection of anomalous activity by processing Domain Name System (DNS) event data generated by one or more computer systems.

BACKGROUND OF THE INVENTION

Dangerous software programs (e.g., malware, ransomware, adware, and spyware) undermine the integrity of many computers worldwide. Network administrators work with product vendors to fortify their environments from attack, using antivirus, endpoint protection, and content filtering software to detect and contain threats. Common detection techniques rely on scanning of files, code, and content to identify unauthorized software, malicious content, and malicious activity, using known signatures and heuristic matching techniques against threats previously analyzed and classified within a laboratory environment.

Existing solutions detect and block known threats based upon previous analyzed samples of malware and malicious content, but find it difficult to detect and block new threats that are yet to be classified as malicious. Many security tools fail to detect emerging threats and targeted campaigns undertaken by determined attackers, because new malware and behavior is not analyzed in a timely manner. This creates a coverage gap in which dangerous software can run within an environment without detection for some time. A method to detect emerging threats is desirable.

Software performing actions that degrade network security or violate the security policy of an environment often uses DNS to communicate with particular Internet-based domains (e.g., command and control infrastructure). It would be desirable to utilize DNS traffic analysis to effectively detect anomalous behavior, uncovering both known and unknown threats.

SUMMARY OF THE INVENTION

An apparatus has a processor and a memory connected to the processor. The memory stores instructions executed by the processor to receive domain name system (DNS) query event data. A timestamp, source internet protocol (IP) address, and fully qualified domain name (FQDN) value are extracted from each DNS query event record. Each FQDN value is classified to generate corresponding key-value pairs. For each source IP address, key-value pairs during a period of time are counted. It is determined if a FQDN value or key-value pair value indicates anomalous behavior. One or more alert messages are generated if anomalous behavior is determined.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

In a service provider embodiment, the apparatus may be installed as one or more compute instances capable of receiving DNS query event data, processing it, and generating alert messages. Various devices and systems can then be configured to submit DNS query event data to the apparatus for analysis. Upon processing, alert messages are provided in JSON format by the apparatus, which are collected, parsed or otherwise analyzed, interpreted, and made available for display by various devices and systems (e.g. IT operations software).

Figure 1:
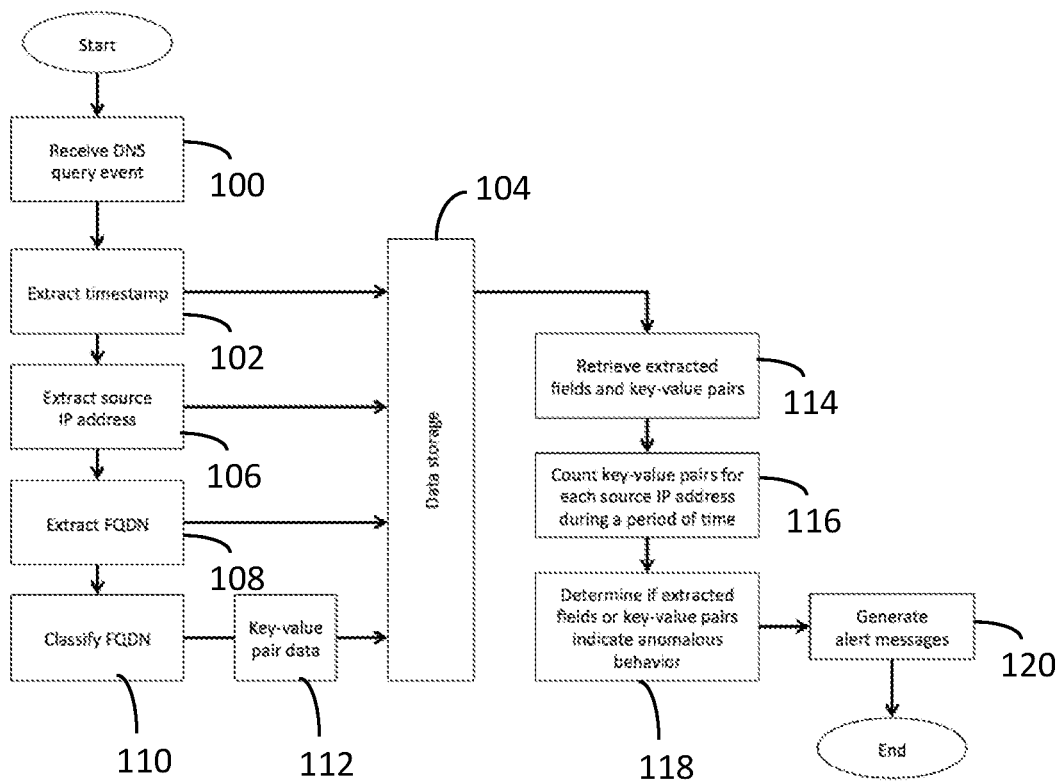
FIG. 1 is a flow diagram of processing to detect anomalous behavior in accordance with an embodiment of the invention.

FIG. 1 is a flow diagram describing one embodiment to detect anomalous behavior. In this embodiment, the apparatus receives a DNS query event 100 and extracts the timestamp 102, which is stored in memory 104. A source IP address is also extracted 106, as is an FQDN data field 108. Upon extracting the data fields, the FQDN value is passed to a classifier 110 which in-turn generates key-value pair data 112, as demonstrated in FIG. 2. Next, the apparatus retrieves the extracted fields and key-value pairs 114, which are counted and analyzed 116. Using pre-defined rules that are stored in memory, the apparatus determines whether the key-value pairs indicate anomalous behavior 118, and if so, one or more alert messages is generated 120.

Figure 2:
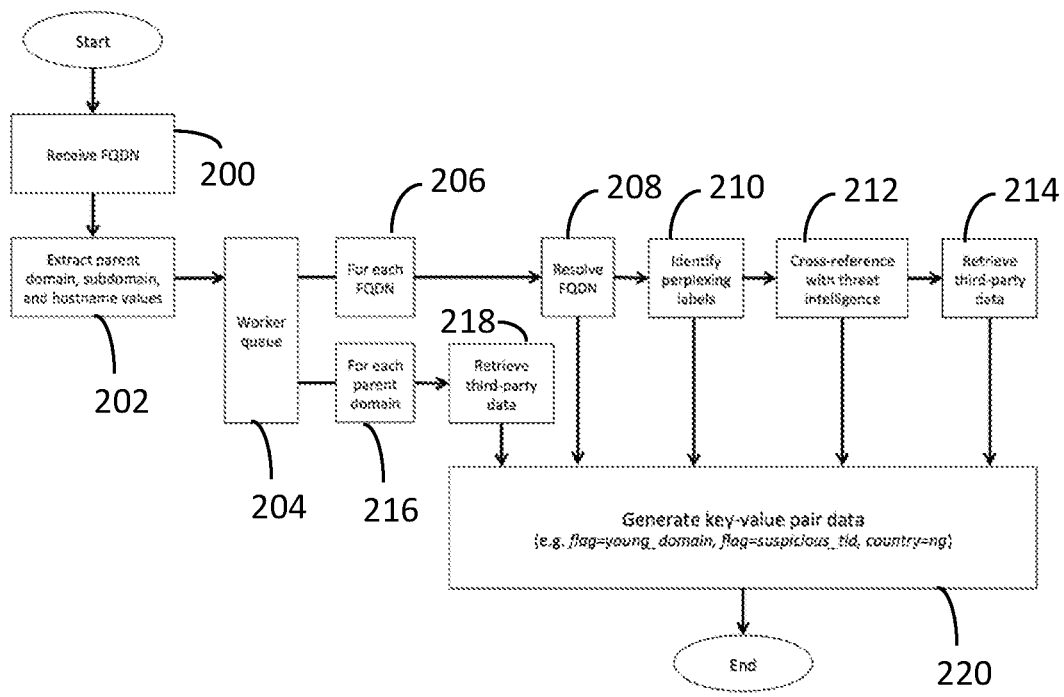
FIG. 2 is a flow diagram of processing to characterize an FQDN value in accordance with an embodiment of the invention.

FIG. 2 is a flow diagram describing the process used to classify an FQDN value (i.e., an example implementation of block 110 in FIG. 1). In this case, the process receives an FQDN value 200 (e.g., maliciousdomain456.biz) and extracts present parent domain, subdomain, and hostname values 202. These are fed into a worker queue 204 for processing. For each FQDN 206, the FQDN is resolved 208. Perplexing labels within the FQDN are identified 210. A cross-reference of the FQDN with threat intelligence is performed 212. Data from third-party services may also be retrieved 214 (e.g., WHOIS data providing the registrant of the parent domain and its date of registration). Worker processes generate key-value pairs (e.g. flag=young_domain, flag=suspicious_tld, country=ng) for each FQDN, which are used by the apparatus to detect anomalous behavior. For each parent domain 216, third-party data may be retrieved 218. The accumulated data is used to generate key-value pair data 220.

The invention is data provider and consumer agnostic: DNS query event data can be sent from one or more sources (e.g., a DNS server, a web proxy server, a network tap or sniffer, a kernel module, or a network driver within a computer system) and alert messages can be consumed by software to reconfigure a network device or terminate a computer program, or escalate to an IT operations team to initiate an investigation.

The invention is more fully appreciated in view of the following examples.

DGA Detection

Known domain names used by command and control (C2) servers are often suspended by Internet service providers and commandeered by law enforcement agencies. To work around this, malware authors use domain generation algorithms (DGAs) within their code to cycle through C2 destinations using an algorithm that is written-into the malware and known to the author to find a valid C2 domain when others are not available.

During this cycling process, an infected machine will resolve a number of DNS domains that have two features: (i) an unregistered domain and (ii) a perplexing domain name label (e.g., alphanumeric strings that are generated using an algorithm, versus legitimate words or labels commonly used online). To demonstrate such DNS traffic, a series of raw events from an infected system is shown in Table 1.

TABLE 1

DNS query event data from an infected system.

| Timestamp | Source IP address | FQDN |
|---|---|---|
| 23 Oct. 2017 12:16:38 | 10.14.1.39 | rproahjondxj.net |
| 23 Oct. 2017 12:16:23 | 10.14.1.39 | bxucquagsqjg.net |
| 23 Oct. 2017 12:15:58 | 10.14.1.39 | hsxfrfokdkojcj.net |
| 23 Oct. 2017 12:15:23 | 10.14.1.39 | jymfezgszvqsa.net |
| 23 Oct. 2017 12:14:45 | 10.14.1.39 | vtneaiksplwp.net |
| 23 Oct. 2017 12:14:42 | 10.14.1.39 | bxucquagsqjg.net |

As demonstrated in FIG. 2, upon receiving DNS event data, the apparatus executes worker processes to resolve each FQDN, identify perplexing labels within an FQDN, cross-reference each FQDN with threat intelligence, and retrieve third-party data for each FQDN and parent domain.

In one embodiment, the FQDN classification system identifies perplexing labels by treating each FQDN label as a Markov chain (memoryless stochastic process), where a single state may be a single character or an n-gram (i.e., 2 characters or 3 characters). One or more probability models may be derived and used depending on various conditions (e.g., the expected language indicated by the Top Level Domain (TLD) value of the FQDN, or the length of a processed label). The models consist of normalized probability of occurrence for given n-gram chains and are derived by processing learning sets comprised of legitimate Internet domain names, words or combination of words in a specific language. For example, a lookup table can be generated from a set of n-gram English words that Google has collected from historical publications (publicly available from http://storage.googleapis.com/books/ngrams/books/datasetsv2.html). If the score exceeds a certain threshold a flag is generated by the FQDN classification system (e.g. perplexing_host or perplexing_domain).

Upon processing DGA traffic, the FQDN classification system attaches key-value pair data (flag=unreachable_domain and flag=perplexing_domain) to each notable event, as demonstrated by Table 2.

TABLE 2

Key-value pair data added by the FQDN classification system.

| Timestamp | Source IP address | FQDN | Key-value pair data |
|---|---|---|---|
| 23 Oct. 2017 12:16:38 | 10.14.1.39 | rproahjondxj.net | flag=perplexing_domain flag=unreachable_domain |
| 23 Oct. 2017 12:16:23 | 10.14.1.39 | bxucquagsqjg.net | flag=perplexing_domain flag=unreachable_domain |
| 23 Oct. 2017 12:15:58 | 10.14.1.39 | hsxfrfokdkojcj.net | flag=perplexing_domain flag=unreachable_domain |
| 23 Oct. 2017 12:15:23 | 10.14.1.39 | jymfezgszvqsa.net | flag=perplexing_domain flag=unreachable_domain |
| 23 Oct. 2017 12:14:45 | 10.14.1.39 | vtneaiksplwp.net | flag=perplexing_domain flag=unreachable_domain |
| 23 Oct. 2017 12:14:42 | 10.14.1.39 | bxucquagsqjg.net | flag=perplexing_domain flag=unreachable_domain |

As demonstrated in FIG. 1, the apparatus retrieves extracted fields and key-value pair data for each source IP address from data storage, and counts the key-value pairs over a specified period of time. The apparatus uses logic to determine whether the extracted fields or key-value pair data indicate anomalous behavior. To identify Domain Generation Algorithm (DGA) traffic and generate an alert message, the apparatus uses the following logic:

"dga_volume": {

Title: "Multiple requests for DGA domains indicating infection",

Severity: 4,

Match: c.Flags.HasAll("perplexing_domain", "unreachable_domain") && c.CountString(" ", time.Hour, c.Domain( ))>=6

},

Here is a breakdown of the conditions to trigger an alert:
Require both perplexing_domain and unreachable_domain flags
Require 6 or greater matching events over a 60-minute period In one embodiment, the alert message is prepared in JSON format, describing the threat and providing supporting data (e.g., the DNS query event data and key-value pairs). Upon processing DGA traffic, one or more alert messages are generated, as demonstrated below:

{"ts":"23-Oct-17 12:22:06", "dest_host":"kbctjkaqugg.net", "severity_id":4, "severity":"high", "src_ip": "10.14.1.39", "original_event":"23-Oct-2017 12:22:06", "flags":["perplexing_domain", "unreachable_domain"], "type":"alert", "threats":["dga_volume"]}

DNS Tunneling Detection

DNS traffic is not monitored or scrutinized within most environments, and so advanced attackers use DNS tunneling to exfiltrate data from compromised systems within a network. The channel is a reliable one to exfiltrate data without triggering data loss prevention (DLP) or other security mechanisms, which are commonplace in modern enterprise networks and monitor protocols including HTTP and SMTP.

Data can be exfiltrated via DNS tunneling by breaking it into small chunks that are encoded within multiple DNS requests under a parent domain controlled by the attacker. To demonstrate such DNS traffic, a series of raw events from a system performing DNS tunneling is shown in Table 3.

TABLE 3

DNS query event data from a system performing DNS tunneling.

| Timestamp | Source IP address | FQDN |
|---|---|---|
| 23 Oct. 2017 12:36:56 | 10.14.1.43 | 00udqqaypoyczznbahzblvcfm.badguy123.com |
| 23 Oct. 2017 12:34:53 | 10.14.1.43 | 00fajkdoj3j3k11okalacncn4.badguy123.com |
| 23 Oct. 2017 12:34:51 | 10.14.1.43 | 00lzcmyvmcldqeptcxvnimyya.badguy123.com |
| 23 Oct. 2017 12:34:50 | 10.14.1.43 | 00efwukoewpbpwbmkvbefiqbh.badguy123.com |
| 23 Oct. 2017 12:34:49 | 10.14.1.43 | 004g24fhq9fhnljjlaf89aklz.badguy123.com |
| 23 Oct. 2017 12:34:48 | 10.14.1.43 | 002bd74fajnoaw4b734obxaji.badguy123.com |

The encoded values in the hostname are captured by the attacker (who controls the authoritative DNS servers for badguy123.com), they are decoded, and are reassembled to recreate the original files and data from the compromised systems.

As demonstrated in FIG. 2, upon receiving DNS event data, the apparatus executes worker processes to resolve each FQDN, identify perplexing labels within an FQDN, cross-reference each FQDN with threat intelligence, and retrieve third-party data for each FQDN and parent domain.

Upon processing DNS tunneling traffic, the FQDN classification system attaches key-value pair data (flag=perplexing_host and country=CN) to each notable event, as demonstrated by Table 4.

TABLE 4

Key-value pair data added by the FQDN classification system.

| Timestamp | Source IP address | FQDN | Key-value pair data |
|---|---|---|---|
| 23 Oct. 2017 12:36:56 | 10.14.1.43 | 00udqqaypoyczznbahzblvcfm.badguy123.com | flag=perplexing_host country=CN |
| 23 Oct. 2017 12:34:53 | 10.14.1.43 | 00fajkdoj3j3k11okalacncn4.badguy123.com | flag=perplexing_host country=CN |
| 23 Oct. 2017 12:34:51 | 10.14.1.43 | 00lzcmyvmcldqeptcxvnimyya.badguy123.com | flag=perplexing_host country=CN |
| 23 Oct. 2017 12:34:50 | 10.14.1.43 | 00efwukoewpbpwbmkvbefiqbh.badguy123.com | flag=perplexing_host country=CN |
| 23 Oct. 2017 12:34:49 | 10.14.1.43 | 004g24fhq9fhnljjlaf89aklz.badguy123.com | flag=perplexing_host country=CN |
| 23 Oct. 2017 12:34:48 | 10.14.1.43 | 002bd74fajnoaw4b734obxaji.badguy123.com | flag=perplexing_host country=CN |

As shown in FIG. 1, the apparatus retrieves extracted fields and key-value pair data for each source IP address from data storage, and counts the key-value pairs over a specified period of time. The apparatus uses logic to determine whether the extracted fields or key-value pair data indicate anomalous behavior. To identify DNS tunneling traffic and generate an alert message, the apparatus uses the following logic:

```
"multiple_long_hostnames": {
  Title: "Multiple requests to long hostnames indicating DNS tunneling",
  Severity: 4,
  Match: func(c *QueryCtx) bool {
    if !c.Flags.HasAny("perplexing_host") {
      return false
    }
    if c.Flags.HasAny("unreachable_domain") {
      return false
    }
    domain:=c.Domain( )
    hostnameLen:=len(c.Query.Fqdn)–len(domain)
    if hostnameLen <20 {
      return false
    }
    hostnames:=c.CountString(domain, time.Hour, c.Query.Fqdn)
    return hostnames >=20
  },
},
```

Here is a breakdown of the conditions to trigger an alert:
Require events with the perplexing_host flag
Discard events with the unreachable_domain flag
Require that the hostname label has 20 or greater characters
Require 20 or greater matching events over a 60-minute period The alert message is prepared in JSON format, describing the threat and providing supporting data (e.g., the DNS query event data and key-value pairs). Upon processing DNS tunneling traffic, one or more alert messages are generated, such as the following:

{"ts":"23-Oct-2017 12:38:20", "dest_host":"00udqqaypoyczznbahzblvcfm.badguy123.com", "severity_id":4,"severity":"high","src_ip":"10.14.1.43","original_event":"23-Oct-2017 12:36:56", "flags":["perplexing_host"], "type":"alert", "threats":["multiple_long_hostnames"]}

Peer-to-Peer (P2P) Network Participation Detection

P2P use within an enterprise of download pirated content (e.g., TV shows, movies, and music) is a common policy violation. During operation, BitTorrent® P2P software interacts with tracker systems online, which orchestrate distribution of content between peers within a BitTorrent® swarm.

To demonstrate such DNS traffic, a series of raw events from system participating in a BitTorrent® swarm is shown in Table 5.

TABLE 5

DNS query event data from a system participating in a P2P network.

| Timestamp | Source IP address | FQDN |
|---|---|---|
| 22 Oct. 2017 23:23:20 | 10.14.1.55 | tracker.publicbt.com |
| 22 Oct. 2017 23:23:35 | 10.14.1.55 | tracker.token.ro |
| 22 Oct. 2017 23:23:35 | 10.14.1.55 | 10.rarbg.me |
| 22 Oct. 2017 23:23:34 | 10.14.1.55 | tracker2.wasabii.com.tw |

TABLE 5-continued

DNS query event data from a system participating in a P2P network.

| Timestamp | Source IP address | FQDN |
|---|---|---|
| 22 Oct. 2017 23:23:21 | 10.14.1.55 | tracker.publicbt.com |
| 22 Oct. 2017 23:23:34 | 10.14.1.55 | tracker.token.ro |

As shown in FIG. 2, upon receiving DNS event data, the apparatus executes worker processes to resolve each FQDN, identify perplexing labels within an FQDN, cross-reference each FQDN with threat intelligence, and retrieve third-party data for each FQDN and parent domain.

Upon processing P2P traffic, the FQDN classification system attaches a key-value pair (flag=p2p) to each notable event, as shown in Table 6.

TABLE 6

Key-value pair data added by the FQDN classification system.

| Timestamp | Source IP address | FQDN | Key-value pair data |
|---|---|---|---|
| 22 Oct. 2017 23:23:20 | 10.14.1.55 | tracker.publicbt.com | flag=p2p |
| 22 Oct. 2017 23:23:35 | 10.14.1.55 | tracker.token.ro | flag=p2p |
| 22 Oct. 2017 23:23:35 | 10.14.1.55 | 10.rarbg.me | flag=p2p |
| 22 Oct. 2017 23:23:34 | 10.14.1.55 | tracker2.wasabii.com.tw | flag=p2p |
| 22 Oct. 2017 23:23:21 | 10.14.1.55 | tracker.publicbt.com | flag=p2p |
| 22 Oct. 2017 23:23:34 | 10.14.1.55 | tracker.token.ro | flag=p2p |

As shown in FIG. 1, the apparatus retrieves extracted fields and key-value pair data for each source IP address from data storage, and counts the key-value pairs over period of time. The apparatus uses logic to determine whether the extracted fields or key-value pair data indicate anomalous behavior. To identify P2P traffic and generate an alert message, the apparatus may use the following logic:
"p2p_activity": {
  Title: "P2P activity",
  Severity: 3,
  Policy: true,
  Match: matchAny("p2p"),
},
  Here is a breakdown of the conditions to trigger an alert:
  Require events with the p2p flag
The alert message is prepared in JSON format, describing the threat and providing supporting data (e.g. the DNS query event data and key-value pairs). Upon processing P2P traffic, one or more alert messages are generated, such as:
{"ts":"22-Oct-2017 23:23:34", "dest_host":"tracker.publicbt.com", "severity_id":3, "severity":"medium", "src_ip": "10.14.1.55", "original_event":"22-Oct-2017 23:23:20", "flags":["p2p"], "type":"alert", "threats":["p2p_activity"]}
Crypto-Currency Mining Detection Many malware families use the hardware of infected systems to mine crypto-currency on behalf of the malware author. During a mining operation, infected machines interact with mining pool systems online, which orchestrate mining tasks and provide payment in crypto-currency (e.g., Monero) to the malware author.

To demonstrate such DNS traffic, a series of raw events from an infected system is shown in Table 7.

TABLE 7

DNS query event data from a system performing crypto-currency mining.

| Timestamp | Source IP address | FQDN |
|---|---|---|
| 23 Oct. 2017 03:23:33 | 10.14.1.62 | us1-zcash.flypool.org |
| 23 Oct. 2017 02:23:28 | 10.14.1.62 | zec.suprnova.cc |
| 23 Oct. 2017 01:23:26 | 10.14.1.62 | eu1-zcash.flypool.org |
| 22 Oct. 2017 23:23:22 | 10.14.1.62 | zec.suprnova.cc |
| 22 Oct. 2017 22:23:21 | 10.14.1.62 | zec-eu1.nanopool.org |
| 22 Oct. 2017 21:23:19 | 10.14.1.62 | us1-zcash.flypool.org |

As shown in FIG. 2, upon receiving DNS event data, the apparatus executes worker processes to resolve each FQDN, identify perplexing labels within an FQDN, cross-reference each FQDN with threat intelligence, and retrieve third-party data for each FQDN and parent domain.

Upon processing crypto-currency mining traffic, the FQDN classification system attaches a key-value pair (flag=cryptomining) to each notable event, as demonstrated by Table 8.

TABLE 8

Key-value pair data added by the FQDN classification system.

| Timestamp | Source IP address | FQDN | Key-value pair data |
|---|---|---|---|
| 23 Oct. 2017 03:23:33 | 10.14.1.62 | us1-zcash.flypool.org | flag=cryptomining |
| 23 Oct. 2017 02:23:28 | 10.14.1.62 | zec.suprnova.cc | flag=cryptomining |
| 23 Oct. 2017 01:23:26 | 10.14.1.62 | eu1-zcash.flypool.org | flag=cryptomining |
| 22 Oct. 2017 23:23:22 | 10.14.1.62 | zec.suprnova.cc | flag=cryptomining |
| 22 Oct. 2017 22:23:21 | 10.14.1.62 | zec-eu1.nanopool.org | flag=cryptomining |
| 22 Oct. 2017 21:23:19 | 10.14.1.62 | us1-zcash.flypool.org | flag=cryptomining |

As shown in FIG. 1, the apparatus retrieves extracted fields and key-value pair data for each source IP address from data storage, and counts the key-value pairs over period of time. The apparatus uses logic to determine whether the extracted fields or key-value pair data indicate anomalous behavior. To identify crypto-currency mining traffic and generate an alert message, the apparatus may use the following logic:
"crypto_currency_mining": {
  Title: "Crypto-currency mining indicating infection or resource abuse",
  Severity: 4,
  Match: matchAny("cryptomining"),
},
  Here is a breakdown of the conditions to trigger an alert:
  Require events with the cryptomining flag
The alert message is prepared in JSON format, describing the threat and providing supporting data (e.g., the DNS query event data and key-value pairs). Upon processing crypto-currency mining traffic, one or more alert messages are generated, such as:

{"ts":"23-Oct-2017 03:24:47", "dest_host":"us1-zcash.flypool.org", "severity_id":4, "severity":"high", "src_ip": "10.14.1.62", "original_event":"23-Oct-2017 03:23:33", "flags":["cryptomining"], "type":"alert", "threats": ["crypto_currency_mining"]}

Figure 3:
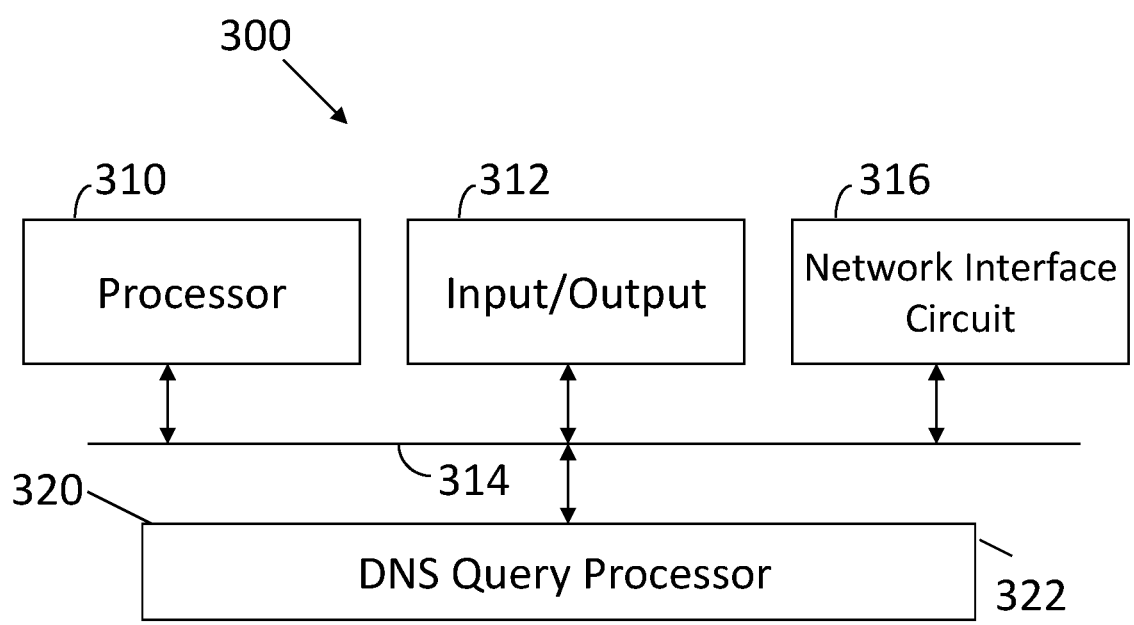
FIG. 3 is a machine configured in accordance with an embodiment of the invention.

FIG. 3 illustrates a machine 300 configured to implement embodiments of the invention. The machine 300 includes a processor connected to input/output devices 312 via a bus 314. The input/output devices 312 may include a keyboard, mouse, touch display and the like. A network interface circuit 316 is also connected to the bus 314 to provide connectivity to one or more networks (not shown). Thus, the machine operates in a networked environment. A memory 320 is also connected to the bus 314. The memory 320 stores instructions executed by processor 310. In this example, the instructions are in the form of a DNS query processor 322. That is, the instructions of the DNS query processor 322 implement the various functions disclosed herein.

Machine 300 is a compute instance capable of receiving DNS query event data, processing it, and generating alert messages. Various networked devices and systems can then be configured to submit DNS query event data to the apparatus 300 for analysis. Upon processing, alert messages are provided in JSON format by the apparatus 300 and are delivered over one or more networks. The messages are collected, parsed or otherwise analyzed, interpreted, and made available for display by various devices and systems (e.g., IT operations software). That is, the message may be displayed on output device 312 of machine 300 or may be delivered over a network to another machine for display.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a processor; and
a memory connected to the processor, the memory storing instructions executed by the processor to:
receive domain name system (DNS) query event data;
extract a timestamp, source internet protocol (IP) address, and fully qualified domain name (FQDN) value from each DNS query event record;
classify FQDN values and generate corresponding key-value pairs characterizing a network security risk;
count, for each source IP address, key-value pairs during a period of time;
determine during the period of time if a key-value pair value indicates anomalous behavior; and
generate one or more alert messages if anomalous behavior is determined.

2. The apparatus of claim 1 wherein the instructions to classify FQDN values include instructions to resolve the FQDN values.

3. The apparatus of claim 1 wherein the instructions to classify FQDN values include instructions to identify perplexing labels.

4. The apparatus of claim 3 wherein the instructions to identify perplexing labels include instructions to treat a FQDN label as a Markov chain.

5. The apparatus of claim 3 wherein the instructions to identify perplexing labels includes instructions to apply a probability model to a FQDN label.

6. The apparatus of claim 1 wherein the instructions to classify FQDN values include instructions to evaluate threat intelligence.

7. The apparatus of claim 1 wherein the instructions to determine anomalous behavior include instructions to identify excessive traffic from a domain deemed to be associated with a domain generation algorithm.

8. The apparatus of claim 1 wherein the instructions to determine anomalous behavior include instruction to identify domain name system tunneling.

9. The apparatus of claim 1 wherein the instructions to determine anomalous behavior include instructions to identify peer-to-peer network participation.

10. The apparatus of claim 1 wherein the instructions to determine anomalous behavior include instructions to identify crypto-currency mining.

* * * * *